US010138345B2

(12) United States Patent
Keppeler

(10) Patent No.: US 10,138,345 B2
(45) Date of Patent: *Nov. 27, 2018

(54) PROCESS FOR THE PRODUCTION OF EXPANDED POLYESTER FOAM BEADS

(71) Applicant: BASF SE, Ludwigshafen (DE)

(72) Inventor: Uwe Keppeler, Hochdorf-Assenheim (DE)

(73) Assignee: BASF SE, Ludwigshafan am Rhein (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/027,803

(22) PCT Filed: Sep. 29, 2014

(86) PCT No.: PCT/EP2014/070727
§ 371 (c)(1),
(2) Date: Apr. 7, 2016

(87) PCT Pub. No.: WO2015/052019
PCT Pub. Date: Apr. 16, 2015

(65) Prior Publication Data
US 2016/0244583 A1  Aug. 25, 2016

(30) Foreign Application Priority Data
Oct. 9, 2013 (EP) ..................... 13187895

(51) Int. Cl.
C08J 9/18 (2006.01)
B29C 44/34 (2006.01)
C08J 9/00 (2006.01)
C08J 9/12 (2006.01)
C08J 9/14 (2006.01)
C08J 9/232 (2006.01)
C08J 9/236 (2006.01)
C08J 9/228 (2006.01)

(52) U.S. Cl.
CPC ............ C08J 9/18 (2013.01); B29C 44/3453 (2013.01); B29C 44/3461 (2013.01); C08J 9/0061 (2013.01); C08J 9/0066 (2013.01); C08J 9/122 (2013.01); C08J 9/141 (2013.01); C08J 9/228 (2013.01); C08J 9/232 (2013.01); C08J 9/236 (2013.01); C08J 2201/034 (2013.01); C08J 2203/06 (2013.01); C08J 2203/14 (2013.01); C08J 2203/182 (2013.01); C08J 2205/052 (2013.01); C08J 2300/16 (2013.01); C08J 2367/02 (2013.01); C08J 2467/04 (2013.01)

(58) Field of Classification Search
CPC ..................... C08J 9/18; C08J 9/20
See application file for complete search history.

(56) References Cited

U.S. PATENT DOCUMENTS

| 5,817,721 A * | 10/1998 | Warzelhan ............ C08G 63/91 525/437 |
| 5,863,991 A | 1/1999 | Warzelhan et al. |
| 5,880,220 A | 3/1999 | Warzelhan et al. |
| 5,889,135 A | 3/1999 | Warzelhan et al. |
| 6,018,004 A | 1/2000 | Warzelhan et al. |
| 6,046,248 A | 4/2000 | Warzelhan et al. |
| 6,111,058 A | 8/2000 | Warzelhan et al. |
| 6,120,895 A | 9/2000 | Kowitz et al. |

(Continued)

FOREIGN PATENT DOCUMENTS

DE  25 42 453 A1  4/1977
EP  0 072 499 A1  2/1983

(Continued)

OTHER PUBLICATIONS

International Preliminary Examination Report for PCT/EP2014/070727 dated Nov. 24, 2015.

(Continued)

Primary Examiner — Kara B Boyle
(74) Attorney, Agent, or Firm — Drinker Biddle & Reath LLP

(57) ABSTRACT

A process for the production of expanded foam beads that are prepared from pellets comprising polyester mixture comprising
a) from 50 to 99% by weight, based on components a and b, of a biodegradable polyester based on aliphatic, or a mixture of aliphatic and aromatic, dicarboxylic acids and an aliphatic diol, and
b) from 1 to 50% by weight, based on components a and b, of polylactic acid,
the process comprising the following steps:
(i) providing an aqueous suspension of the polyester pellets,
(ii) impregnating the pellets in the suspension of step (i) with at least one physical or chemical blowing agent to provide blowing-agent-loaded pellets in suspension, wherein the impregnation of the at least one blowing agent includes heating the mixture to a depressurization temperature IMT with stirring, and
(iii) depressurizing the suspension obtained in step (ii) to provide the expanded foam beads.
The at least one blowing agent is added to the suspension in step (i), or in step (ii) during the heating phase, or immediately after the heating phase, and following the heating of step (ii), the suspension is maintained at a temperature in the range from IMT minus 5° C. to IMT plus 2° C. for a period of 3 to 100 minutes. The invention further relates to expanded foam beads obtained by the process, and to the production of moldings from the expanded foam beads.

8 Claims, No Drawings

(56) References Cited

U.S. PATENT DOCUMENTS

| | | | |
|---|---|---|---|
| 6,258,924 B1 | 7/2001 | Warzelhan et al. | |
| 6,353,084 B1 | 3/2002 | Warzelhan et al. | |
| 6,458,858 B1 * | 10/2002 | Braun .................. | C08J 9/18 |
| | | | 521/138 |
| 9,206,311 B2 | 12/2015 | Steinke et al. | |
| 9,234,073 B2 | 1/2016 | Siegenthaler et al. | |

FOREIGN PATENT DOCUMENTS

| | | |
|---|---|---|
| EP | 1 182 225 A1 | 2/2002 |
| EP | 1378538 A1 | 1/2004 |
| EP | 1 514 896 A1 | 3/2005 |
| EP | 1 533 335 A1 | 5/2005 |
| EP | 1683828 A2 | 7/2006 |
| EP | 2336225 A1 | 6/2011 |
| WO | WO-92/09654 A2 | 6/1992 |
| WO | WO-9615173 A1 | 5/1996 |
| WO | WO-9615174 A1 | 5/1996 |
| WO | WO-9615175 A1 | 5/1996 |
| WO | WO-9615176 A1 | 5/1996 |
| WO | WO-9621689 A2 | 7/1996 |
| WO | WO-9621690 A1 | 7/1996 |
| WO | WO-9621691 A1 | 7/1996 |
| WO | WO-9621692 A1 | 7/1996 |
| WO | WO-96/25446 A1 | 8/1996 |
| WO | WO-96/25448 A1 | 8/1996 |
| WO | WO-9812242 A1 | 3/1998 |
| WO | WO-00/68303 A1 | 11/2000 |
| WO | WO-2006/097353 A1 | 9/2006 |
| WO | WO-2006/097354 A1 | 9/2006 |
| WO | WO-2008/130226 A2 | 10/2008 |
| WO | WO-2010034689 A1 | 4/2010 |
| WO | WO-2010034711 A1 | 4/2010 |

OTHER PUBLICATIONS

International Search Report for PCT/EP2014/070727 dated Nov. 5, 2014.

* cited by examiner

PROCESS FOR THE PRODUCTION OF EXPANDED POLYESTER FOAM BEADS

CROSS-REFERENCE TO RELATED APPLICATIONS

This application is a national stage application (under 35 U.S.C. § 371) of PCT/EP2014/070727, filed Sep. 29, 2014, which claims benefit of European Application No. 13187895.1, filed Oct. 9, 2013, both applications of which are incorporated herein by reference in their entirety.

The invention relates to a process for the production of expanded foam beads from pellets comprising polyester mixture composed of:
a) from 50 to 99% by weight, based on components a and b, of a biodegradable polyester based on aliphatic or aliphatic and aromatic dicarboxylic acids and on aliphatic diols, and to an extent of
b) from 1 to 50% by weight, based on components a and b, of polylactic acid,
comprising the following steps:
(i) production of a suspension comprising pellets of the polyester mixture in a suspension medium,
(ii) impregnation of the pellets comprised in the suspension from step (i) with at least one physical or chemical blowing agent, in order to obtain blowing-agent-loaded pellets in suspension, by heating the mixture to the depressurization temperature IMT, with stirring, and
(iii) after expiry of the retention time, depressurization of the suspension obtained in step (ii), in order to obtain expanded foam beads,
which comprises proceeding in an aqueous suspension medium, adding the blowing agent in step (i) or in step (ii) during the heating phase or immediately after the heating phase, and in step (ii), after heating, keeping the suspension for from 3 to 100 minutes at a temperature in the range from IMT minus 5° C. to IMT plus 2° C.

The invention further relates to expanded foam beads obtainable by said process, and also to the production of moldings from said foam beads.

BACKGROUND OF THE INVENTION

Plastics foams are synthetically produced materials with cell structure throughout their entire volume, with a density lower than that of the compact material from which they were produced. Their importance as lightweight construction material is constantly increasing, because they often have an unusual combination of mechanical properties with low densities. Thermal conductivity values are often very low, and therefore some foams have considerable importance as insulation material.

The disposal of plastics foams after use thereof is sometimes problematic. Another possibility often also available alongside energy recycling is materials recycling. However, biodegradability by way of example in a composting system would be desirable.

Polyester-based foams are known from various publications. These foams are usually produced by an extrusion process.

Said process has the disadvantage that it can generally produce only simple shapes such as blocks, sheets, and thin layers (foam foils). There is also often a restriction on the maximum thickness of blocks that can be produced by this process. In contrast, moldings of almost any desired geometry can be produced by using foam beads.

WO 2008/130226 describes by way of example the production of expandable polylactic acid beads, which are coated with special additives, and foam beads obtainable therefrom. In this case, extrusion processes are used. However, the mechanical properties of moldings produced therefrom are not always suitable for applications which require high tensile strengths and high compression strength.

The described problems can be avoided by using what is known as the autoclave process as described by way of example in Ullmann's Encyclopedia of Industrial Chemistry, vol. A11 1988. The range of requirements placed upon the foam beads thus produced and, respectively, the moldings resulting therefrom can differ greatly, depending on application sector. However, it is possible to define minimum requirements for the suitability of the process for various materials. These are:

The capability to produce foam beads over a wide range of bulk density, and in particular here it should be possible to achieve a very low bulk density irrespective of bead geometry and size. A low weight of the resultant moldings leads to cost savings.

The capability to produce foam beads with a very low particle size distribution (PSD) within a batch in a very large yield.

Foam beads with predominantly closed-cell foam structure. This leads to good processability in commercially available molding machines using the pressure-fill method, and to low water absorption.

Complete impregnation of the polymer beads to give foam beads without compact core. (No impairment of mechanical properties or of haptic properties of the resultant moldings.)

Numerous parameters can be varied in the autoclave process in order to comply with these requirements. These are inter alia the suspension medium, the type of blowing agent and concentration thereof, the heating curve, and the impregnation temperature (IMT). It is not generally possible here to take a parameter, or parameter combination, that is particularly suitable for one material and use it for another material.

WO 00/68303 describes in general terms the production of expanded polymer beads based on biodegradable saturated polyesters in an autoclave process. Suspension medium preferably used here is ethylene glycol and glycerol with a density of from 1.1 to 1.25 g/cm$^3$. These processes are not always entirely satisfactory in respect of the procedure, the capability of the process, and the property profile of the expanded foam beads thus obtainable.

EP 1683828 describes the production of expandable polymer beads on the basis of mixtures of different polylactic acid in an autoclave process. Very low impregnation temperatures and impregnation times of a number of hours are selected here. These expandable polymer beads are then foamed in a separate step to give expanded polymer beads.

EP 1378538 describes expanded beads based on mixtures of semicrystalline and amorphous polylactic acid, where the beads comprise at least 50% of polylactic acid. However, the autoclave production process usually takes place without liquid suspension medium with $CO_2$ and impregnation temperatures below 30° C., and consequently impregnation times of a number of hours.

Operations in both applications do not take place in an aqueous suspension medium, and the overall description in both applications is of a process that is neither economic nor feasible.

DETAILED DESCRIPTION OF THE INVENTION

We have now found an autoclave process with good capability for the direct production of expanded foam beads from pellets, comprising a polyester mixture, composed of:
a) from 50 to 99% by weight, based on components a and b, of a biodegradable polyester based on aliphatic or aliphatic and aromatic dicarboxylic acids and on aliphatic diols, and to an extent of
b) from 1 to 50% by weight, based on components a and b, of polylactic acid,
which comprises the following steps:
(i) production of a suspension comprising pellets of the polyester mixture in a suspension medium,
(ii) impregnation of the pellets comprised in the suspension from step (i) with at least one physical or chemical blowing agent, in order to obtain blowing-agent-loaded pellets in suspension, by heating the mixture to the depressurization temperature IMT, with stirring, and
(iii) after expiry of the retention time, depressurization of the suspension obtained in step (ii), in order to obtain expanded foam beads,
which comprises proceeding in an aqueous suspension medium, adding the blowing agent in step (i) or in step (ii) during the heating phase or immediately after the heating phase, and in step (ii), after heating, keeping the suspension for from 3 to 100 minutes at a temperature in the range from IMT minus 5° C. to IMT plus 2° C.

This process has good capability for producing expanded foam beads which correspond to the above-described minimum requirements, without the above-described problems. The foam beads can, surprisingly, be readily processed to give moldings having excellent mechanical properties in respect of tensile strength and compressive strength t.

The invention is described in more detail below.

The process of the invention for the production of expanded foam beads can use pellets comprising the polyester mixtures a, b mentioned at the outset.

Component a is a biodegradable polyester based on aliphatic or on aliphatic and aromatic dicarboxylic acids, and on aliphatic dihydroxy compounds. The latter are also termed semiaromatic polyesters. All of these polyesters are biodegradable in accordance with DIN EN 13432. It is also possible, of course, to use mixtures of a plurality of polyesters of this type.

The expression semiaromatic (aliphatic-aromatic) polyesters is intended in the invention to include polyester derivatives which comprise up to 10 mol % of functions other than ester functions, examples being polyetheresters, polyesteramides, polyetheresteramides, and polyesterurethanes. Among the suitable semiaromatic polyesters are linear polyesters that have not been chain-extended (WO 92/09654). Preference is given to chain-extended and/or branched semiaromatic polyesters. The latter are known from the documents WO 96/15173 to 15176, 21689 to 21692, 25446, 25448, or WO 98/12242 mentioned at the outset, expressly incorporated herein by way of reference. It is equally possible to use mixtures of various semiaromatic polyesters. More recent developments of interest are based on renewable raw materials (see WO-A 2006/097353, WO-A 2006/097354, and WO2010/034689). The expression semiaromatic polyesters in particular means products such as Ecoflex® (BASF SE), and Easter® Bio, and Origo-Bi® (Novamont).

Among the preferred aliphatic and particularly preferred semiaromatic polyesters are polyesters which comprise, as essential components:
A1) from 30 to 100 mol %, preferably from 30 to 70 mol %, and with particular preference from 40 to 60 mol %, based on components A1) to A2), of an aliphatic dicarboxylic acid or a mixture thereof,
A2) from 0 to 70 mol %, preferably from 30 to 70 mol %, and with particular preference from 40 to 60 mol %, based on components A1) to A2), of an aromatic, dicarboxylic acid or a mixture thereof,
B) from 98.5 to 100 mol %, based on components A1) to A2), of a diol component made of a $C_2$- to $C_{12}$-alkanediol or a mixture thereof; and
C) from 0.05 to 1.5% by weight, based on components A1) to A2) and B), of a compound or plurality of compounds selected from the group consisting of:
C1) a compound having at least three groups capable of ester formation,
C2) a di- or polyfunctional isocyanate,
C3) a di- or polyfunctional epoxide.

Aliphatic acids and the corresponding derivatives al that can generally be used are those having from 2 to 18 carbon atoms, preferably from 4 to 10 carbon atoms. They can be either linear or branched. However, it is also possible in principle to use dicarboxylic acids having a greater number of carbon atoms, for example having up to 30 carbon atoms.

The following may be mentioned by way of example: oxalic acid, malonic acid, succinic acid, glutaric acid, 2-methylglutaric acid, 3-methylglutaric acid, α-ketoglutaric acid, adipic acid, pimelic acid, azelaic acid, sebacic acid, brassylic acid, fumaric acid, 2,2-dimethylglutaric acid, suberic acid, diglycolic acid, oxalacetic acid, glutamic acid, aspargic acid, itaconic acid, and maleic acid. It is possible here to use the dicarboxylic acids or ester-forming derivatives thereof individually or in the form of a mixture made of two or more thereof.

It is preferable to use succinic acid, adipic acid, azelaic acid, sebacic acid, brassylic acid, or respective ester-forming derivatives thereof, or a mixture thereof. It is particularly preferable to use succinic acid, adipic acid, or sebacic acid, or respective ester-forming derivatives thereof, or a mixture thereof. Succinic acid, azelaic acid, sebacic acid, and brassylic acid moreover have the advantage that they are obtainable from renewable raw materials.

Particular preference is given to the following aliphatic-aromatic polyesters: polybutylene adipate terephthalate (PBAT), polybutylene sebacate terephthalate (PBSeT), and polybutylene succinate terephthalate (PBST), and very particular preference is given to polybutylene adipate terephthalate (PBAT) and polybutylene sebacate terephthalate (PBSeT).

The aromatic dicarboxylic acids or ester-forming derivatives thereof A2 can be used individually or in the form of a mixture made of two or more thereof. It is particularly preferable to use terephthalic acid or ester-forming derivatives thereof, for example dimethyl terephthalate.

The diols B are generally selected among branched or linear alkanediols having from 2 to 12 carbon atoms, preferably from 4 to 6 carbon atoms, or among cycloalkanediols having from 5 to 10 carbon atoms.

Examples of suitable alkanediols are ethylene glycol, 1,2-propanediol, 1,3-propanediol, 1,2-butanediol, 1,4-butanediol, 1,5-pentanedial, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 2,2,4-trimethyl-1,6-hexanediol, in particular ethylene glycol, 1,3- propanediol, 1,4-butanediol, and 2,2-dimethyl-1,3-propanediol (neopentyl glycol). Particular preference is given to 1,4-butanediol and 1,3-propanediol. The latter moreover have the advantage that they are obtainable in the form of renewable raw material. It is also possible to use mixtures of various alkanediols.

Use is generally made of from 0.01 to 2% by weight, preferably from 0.1 to 1.0% by weight, and with particular preference from 0.1 to 0.3% by weight, based on the total weight of the polyester, of a branching agent (C1), and/or of from 0.1 to 1.0% by weight, based on the total weight of the polyester, of a chain extender (C2 or C3). It is preferable that the branching agent is selected from the group consisting of: a polyfunctional isocyanate, isocyanurate, oxazoline, epoxide, peroxide, carboxylic anhydride, an at least trihydric alcohol, or an at least tribasic carboxylic acid. Particular chain extenders that can be used are difunctional isocyanates, isocyanurates, oxazolines, carboxylic anhydride, or epoxides.

Particularly preferred branching agents have from 3 to 6 functional groups. The following may be mentioned by way of example: tartaric acid, citric acid, malic acid; trimethyloipropane, trimethylolethane; pentaerythritol; polyethertriols and glycerol, trimesic acid, trimellitic acid, trimellitic anhydride, pyromellitic acid, and pyromellitic dianhydride. Preference is given to polyols such as trimethyloipropane, pentaerythritol, and in particular glycerol. By using component C it is possible to construct biodegradable polyesters having pseudoplasticity. The biodegradable polyesters have better processability.

The number-average molar mass (Mn) of the polyesters is generally in the range from 5000 to 100 000 g/mol, in particular in the range from 10 000 to 75 000 g/mol, preferably in the range from 15 000 to 38 000 g/mol, their weight-average molar mass (Mw) being from 30 000 to 300 000 g/mol, preferably from 60 000 to 200 000 g/mol, and their Mw/Mn ratio being from 1 to 6, preferably from 2 to 4. Intrinsic viscosity is from 50 to 450 g/mL, preferably from 80 to 250 g/mL (measured in o-dichlorobenzene/phenol (ratio by weight 50/50)). Melting point is in the range from 85 to 150° C., preferably in the range from 95 to 140° C.

The preferred semiaromatic polyesters are characterized by a molar mass (Mn) in the range from 1000 to 100 000 g/mol, in particular in the range from 9000 to 75 000 g/mol, preferably in the range from 10 000 to 50 000 g/mol, and by a melting point in the range from 60 to 170° C., preferably in the range from 80 to 150° C.

The expression aliphatic polyesters means polyesters made of aliphatic diols and aliphatic dicarboxylic acids, for example polybutylene succinate (PBS), polybutylene adipate (PBA), polybutylene succinate adipate (PBSA), polybutylene succinate sebacate (PBSSe), polybutylene sebacate (PBSe), or corresponding polyesteramides or polyesterurethanes. The aliphatic polyesters are marketed by way of example by Showa Highpolymers as Bionolle and by Mitsubishi as GSPla. WO2010034711 describes more recent developments. Preferred aliphatic polyesters are polybutylene succinate sebacate (PBSSe) and in particular polybutylene succinate (PBS).

The intrinsic viscosities of the aliphatic polyesters in accordance with DIN 53728 are generally from 150 to 320 $cm^3/g$ and preferably from 150 to 250 $cm^3/g$.

MVR (melt volume rate) in accordance with EN ISO 1133 (190° C., 2.16 kg weight) is generally from 0.1 to 70 $cm^3/10$ min, preferably from 0.8 to 60 $cm^3/10$ min, and in particular from 1 to 50 $cm^3/10$ min.

Acid numbers in accordance with DIN EN 12634 are generally from 0.01 to 1.2 mg KOH/g, preferably from 0.01 to 1.0 mg KOH/g, and with particular preference from 0.01 to 0.7 mg KOH/g.

The polyesters can also comprise mixtures made of aliphatic-aromatic polyesters and of purely aliphatic polyesters, for example mixtures made of PBAT and PBS.

Component b) is preferably polylactic acid with the following property profile: melt volume rate (MVR at 190° C. with 2.16 kg in accordance with ISO 1133) of from 0.5 to 15 mL/10 minutes, preferably from 1 to 9 mL/10 minutes, particularly preferably from 2 to 8 mL/10 minutes; melting point below 180° C.; glass transition temperature (Tg) above 40° C.; water content below 1000 ppm; residual monomer content (lactide) below 0.3%, and molecular weight above 50 000 daltons.

Examples of preferred polylactic acids are the following from NatureWorks®: Ingeo® 2002 D, 4032 D, 4042 D, and 4043 D, 8251 D, 3251 D, and 8051 D. Ingeo® 8051 D by way of example is a polylactic acid from NatureWorks with the following properties: Tg: 65.3° C., Tm: 153.9° C., MVR: 6.9 [ml/10 minutes], Mw: 186 000, Mn: 107 000.

Polyester mixtures comprising components a and b are traded by BASF SE with trademark Ecovio®. Admixture of the polylactic acid component having higher stiffness permits specific tailoring of the usage properties of the foam beads. However, polyester component a) should form the continuous phase in the mixture, in order to ensure the capability of the process. Polylactic acid is susceptible to hydrolysis under the conditions of the process, and this is particularly noticeable when polylactic acid (b) forms the continuous phase.

The polyester mixtures comprise:
  a) from 50 to 99% by weight, preferably from 60 to 95% by weight, and with particular preference from 70 to 90% by weight, based on components a and b, of an aliphatic or semiaromatic polyester as has been described above, and
  b) from 1 to 50% by weight, preferably from 5 to 40% by weight, and with particular preference from 10 to 30% by weight, based on components a and b, of polylactic acid.

The individual steps (i) to (iii) of the process of the invention are described in detail below.

Step (i) of the process of the invention comprises the production of a suspension comprising pellets of the polyester mixture described above in a suspension medium.

Step (i) of the process of the invention uses the polyester mixture in the form of pellets. The process permits the use of a wide range of different particle sizes and therefore also particle weights. However, the particle size (particle weight) is one of the decisive parameters that influence the selection of the correct production parameters. The particle weight determines the weight, and influences the size, of the expanded foam beads. Preferred particle size and bulk density of the foam beads differ, depending on the application.

The average diameter of the polyester pellets can be from 0.2 to 10 mm, in particular from 0.5 to 5 mm. These pellets, preferably cylindrical or round, can be produced by any of the processes known to the person skilled in the art, in particular via extrusion of the polyester, optionally together with other additional substances, extrusion from the extruder, optional cooling, and pelletization. These pellets preferably used in step (i) are also termed "mini pellets". The weight of an individual pellet of this type is generally from 0.5 to 100 mg. Preference is given to pellets having an average pellet weight (arithmetic mean) of from 5 to 60 mg/pellet. EP 1 182 225 B1 describes a process for the production of polyethylene pellets which by analogy is also suitable for the production of the polyester pellets.

The pellets preferably used in step (i) of the process of the invention can optionally comprise other additives.

These can by way of example be nucleating agents which can influence the type of cell. Quantities generally used of these are from 0.001 to 10.0%, based on the pellets, preferably from 0.01 to 1.0%, very particularly preferably from 0.02 to 0.2%. Examples of suitable materials are talc powder, paraffins and/or waxes, and also carbon black, graphite, and fumed silicas, and moreover natural or synthetic zeolites and, optionally modified, bentonites, particular preference being given to talc powder.

The pellets preferably used in step (i) can moreover comprise conventional additional substances such as antioxidants, stabilizers, flame retardants, waxes, fillers, pigments, and dyes. Suitable additives are known per se to the person skilled in the art and are listed by way of example in EP 1 514 896 A1.

In step (i) of the process of the invention the pellets are suspended in a suitable suspension medium. In general it is possible to use any of the suspension media known to the person skilled in the art to be suitable, where these ensure that the pellets used do not dissolve therein. Examples of particularly suitable aqueous suspension media in the invention are water, and mixtures of water with from 5 to 50% by weight, based on the mixture, of a polar organic solvent, for example methanol, ethanol, propanols such as isopropanol, glycerol, ethylene glycol, or ketones such as acetone, or a mixture of the organic solvents. In order to obtain a suspension of the pellets with maximum homogeneity with minimum use of agitation resource, WO00/68303 gave preference to selection of a suspension medium of density comparable with that of the pellets—i.e. densities from 1.1 to 1.3 kg/m$^3$. WO 00/68303 therefore recommends use of liquids such as ethylene glycol and glycerol with densities of from 1.1 to 1.3 kg/m$^3$ as suspension medium. Substances such as ethylene glycol are, however, hazardous to health and above the flashpoint form flammable vapor-air mixtures. Surprisingly, it has now been found that step (i) of the process of the invention can use an aqueous mixture or preferably water as suspension medium which does not have the abovementioned disadvantages. However, aqueous suspension media do not provide a process with good capability if polylactic acid b) forms the continuous phase in the polyester mixtures. Polylactic acid b should therefore be present in the polyester mixtures used in step (i) in an amount of not more than 50% by weight.

The quantity of suspension medium in the suspension is generally selected in such a way that the phase ratio of pellets used in step (i) to suspension medium is >0.2, preferably >0.25. The phase ratio of pellets used in step (i) to suspension medium is generally <1.20, preferably <1.00, particularly preferably <0.80.

The phase ratio of the invention relates to the ratio of pellets, measured in kilograms, to suspension medium, likewise in kilograms. The person skilled in the art is aware of methods for adjusting the ratio of the invention, and by way of example 500 kg of pellets in 1000 kg of water gives a granulate:water phase ratio of 0.5.

The quantity of pellets introduced into the suspension according to step (i) is calculated from the granulate:suspension medium phase ratio described above.

It is preferable that the pellets are suspended in water in a stirred reactor. It is preferable here to use at least one suspension aid in order to ensure uniform distribution of the pellets in the suspension medium.

Suitable suspension aids are water-insoluble inorganic stabilizers, for example tricalcium phosphate, magnesium pyrophosphate, metal carbonates, and moreover polyvinyl alcohol, and surfactants. The quantities used of these suspension aids, in particular the water-insoluble inorganic stabilizers mentioned, are usually from 0.005 to 10% by weight, based on the entire suspension. The quantity used of ionic surfactants, for example sodium dodecylarylsulfonate, or of nonionic surfactants, for example fatty alcohol ethoxylates as described by way of example in "Ullmann's Encyclopedia of Industrial Chemistry, sixth edition, topic: Surfactants", is usually from 2 to 2000 ppm, in particular from 2 to 500 ppm, based on the entire suspension. It is usual to use a water-insoluble compound in combination with a surface-active substance (surfactant).

However, it is also possible to carry out the process of the invention without any water-insoluble inorganic stabilizer.

Step (i) of the process of the invention can be carried out at any of the suitable temperatures. These temperatures are known to the person skilled in the art, and by way of example step (i) of the process of the invention is generally carried out at a temperature at which the suspension medium used is liquid, for example at a temperature of from 15 to 35° C., particularly preferably at ambient temperature.

Step (ii) of the process of the invention comprises the impregnation of the pellets comprised in the suspension from step (i) with at least one blowing agent, in order to obtain blowing-agent-loaded pellets in suspension.

Operations in step (ii) of the process of the invention are by way of example carried out in an impregnation vessel, e.g. in a stirred-tank reactor. The suspension from step (i) of the process of the invention is generally present in the reactor, for example in an impregnation tank, preferably taking the form of mini pellets in water as suspension medium, optionally with a suspension aid. At least one blowing agent is then preferably metered into said suspension.

It is generally possible to use any of the blowing agents known to the person skilled in the art. The boiling point of the blowing agent is generally from −25 to 150° C. at atmospheric pressure, in particular from −10 to 125° C.

The blowing agent is preferably a linear or cyclic aliphatic hydrocarbon, for example methane, ethane, n-propane, isopropane, n-butane, isobutene, pentanes, cyclopentane, hexanes, and heptanes, halogenated hydrocarbons, for example dichlorodifluoromethane, trichloromonofluoromethane, an alcohol, for example methanol, ethanol, n-propanol, isopropanol, and n-butanol, a ketone, for example 3,3-dimethyl-2-butanone and 4-methyl-2-pentanone, an ether, ester, or nitrogen, air, or carbon dioxide. It is also possible to use blowing agent mixtures. It is preferable to use butane as blowing agent—the material used in practice often being a industrial mixture of n- and isobutane—and to use nitrogen as co-blowing agent.

By virtue of the different solubilities of the blowing agents in the polyesters of the invention it is possible, via the selection of the blowing agent and the quantity used of the blowing agent, to influence the properties of the expanded foam beads, in particular the bulk density, the type of cell, and the crystallinity. These particle properties in turn influence the subsequent processability and the properties of the moldings resulting from processing.

It is preferable to use, as blowing agent, n-butane, isobutane, the abovementioned industrial mixture of the two butanes, carbon dioxide, and/or nitrogen, and it is particularly preferable to use n-butane or carbon dioxide. Carbon dioxide and/or nitrogen can, as mentioned above, be used as co-blowing agents.

Again, the quantity used of the at least one blowing agent is generally from 1 to 50% by weight, preferably from 1 to 30% by weight, particularly preferably from 5 to 25% by weight, based in each case on the pellets. This quantity of blowing agent in particular ensures good impregnation quality. The blowing agent can be introduced all at once or in portions. A co-blowing agent, e.g. nitrogen, is usually introduced at an onset temperature below the first melting peak in the DSC of the inventive polyester mixture, e.g. at 50° C. In this context, the internal pressure in the impregnation reactor is increased by 2-15 bar by introducing the co-blowing agent under pressure.

The reactor content is generally heated at a high heating rate, i.e. >1.5° C./min, preferably >2.0° C./min, to a suspension temperature of from 90 to 110° C. The addition of blowing agent here can take place prior to, during, or after the heating of the reactor content, preferably prior to the heating. However, the blowing agent should be added before the start of the retention time.

The actual impregnation temperature, i.e. the temperature at which a sudden depressurization takes place in the step (iii), should be in the vicinity of the softening point of the copolyester, for example from 30° C. below to 20° C. above the melting point (crystallite melting point) of the polyester. Preferred impregnation temperatures for the copolyesters of the invention are from 100 to 140° C., in particular from 100 to 130° C.

The resultant pressure (impregnation pressure) in the sealed reactor depends on the quantity and nature of the blowing agent, and also on the temperature, and is generally a gauge pressure of from 10 to 40 bar.

By virtue of the elevated temperature prevailing under the impregnation conditions, and the gauge pressure, blowing agent diffuses into the pellets of the copolyesters of the invention. This takes place at a rate that varies with the nature and concentration of the blowing agent, the pellet weight, the selected phase ratio, and also the fill level of the tank. However, foam beads with the desired property profile can be obtained in step (iii) of the process only if there is complete impregnation.

The selected impregnation parameters of pellet weight, suspension medium, type and concentration of the blowing agent, phase ratio, fill level of the tank, and IMT influence, within certain limits, the subsequent crystallinity of the foam beads and thus the other physical properties of said beads, and also the properties thereof during processing to give the molding.

We have now found that the essential parameter for establishing the crystallinity of the foam beads is a retarded heating rate 5° C. before reaching the IMT. In particular, an average heating rate that has proven to be advantageous 5° C. before reaching the IMT is from 0.05 to 1.5° C./min, preferably from 0.1 to 1.0° C./min, and particularly preferably from 0.1 to 0.8° C./min.

The slow average heating rate in the region of the IMT corresponds in practice to a retention time of the suspension, during the impregnation procedure, in a temperature range from 5° C. below the IMT and 2° C. above the IMT for a period of from 3 to 100 minutes, preferably from 5 to 50 minutes, and with particular preference from 15 to 40 minutes.

With high average heating rate (>1.5° C./min) and, respectively, retention times below 3 minutes it is not possible even at high blowing agent concentrations and, respectively, via an increase in the IMT, to achieve either low bulk densities (<300 kg/m$^3$) or acceptable impregnation qualities. There is also sometimes a drastic deterioration in the homogeneity of the product (narrow bead size distribution). Average heating rates that are even lower and, respectively, retention times that are even longer, above 100 minutes, do not provide any significant improvement, and are not economically justifiable.

The process of the invention is aimed at a narrow bead size distribution within a batch, and full expansion of the pellets of starting material to give foam beads. Nevertheless, it is usually necessary to use a sieve of mesh width M, where M=BD*1.1, to separate the batch from unfoamed or incompletely foamed material, where BD is the average bead diameter in the case of pellets produced by underwater pelletization, and in the case of pellets produced by strand pelletization is the longer diameter of the round or near-elliptical sectional surface. In the event of inadequate impregnation quality, the sieve waste is above 15%, i.e. the acceptable fraction (yield) is <95%. In the case of acceptable homogeneity, sieve waste is from 5% to 15%, and in the case of good homogeneity sieve waste is <5%, i.e. the yield is above 95%.

The foaming of the beads should also have provided a uniform cell structure. When cell structure is inadequate, compact material is present in the center, and also sometimes at the periphery, of a foam bead from the good fraction of the sieving or, over the entire volume of the foam bead, there are cells (even if just a few) present with cell walls of thickness >500 µm.

Acceptable cell structure meant complete impregnation of the polymer beads (cellular structure over the entire volume of the foam bead without compact core and, respectively, the thickness of the cell walls in the center was from 150 µm to 500 µm). A layer of thickness <500 µm at the external shell of the foam bead is finely cellular to compact.

When cell structure is good, the thickness of the cell walls in the center is smaller than 150 µm. A layer of thickness <500 µm at the external shell of the foam bead is finely cellular to compact.

As a consequence of the selection of the impregnation parameters (e.g. disadvantageous combination of blowing agent concentration, impregnation temperature, and retention time) it is possible that, although the particles have a good cell structure they nevertheless, at the end of the process step of the invention, have a totally collapsed bead surface. This occurs in particular when quenching is omitted. The intention is to produce firm foam beads with a smooth and glossy bead surface.

At the end of step (ii) of the invention, blowing-agent-loaded pellets are obtained in suspension.

Step (iii) of the process of the invention comprises the depressurization and cooling of the suspension obtained in step (ii) via contact with a suitable coolant (quench process). A suitable quench process is by way of example described in EP 2336225, where quenching is achieved via addition of a certain quantity of coolant.

In step (iii) of the process of the invention, the suspension is usually depressurized via a suitable device. It is preferable that the suspension initially leaves the impregnation tank via a valve. In order to reduce turbulence of the depressurized jet and in order to develop laminar flow, said jet can then preferably be conducted through a short section of a depressurization pipe, the end of which bears a perforated plate. The depressurization time can be controlled via length and diameter of the depressurization pipe, and also the perforated plate diameter.

The suspension can be depressurized immediately to atmospheric pressure, for example 1013 mbar. However, it is preferable to depressurize into an intermediate vessel, the pressure in which is adequate for the foaming of the blowing-agent-loaded pellets, but can be above atmospheric pressure. By way of example, depressurization is carried out to a gauge pressure of from 0.5 to 5 bar, in particular of from 1 to 3 bar. During the depressurization, the impregnation pressure produced (pressure produced via the selected impregnation parameters before the depressurization step) in the impregnation vessel can be kept constant, by subsequent addition of pressurized blowing agent or inert gas, e.g. nitrogen. However, it is also possible and often advantageous a few seconds before the depressurization to increase the existing impregnation pressure further by introducing nitrogen under pressure (ejection pressure), generally up to 40 bar, and then likewise to keep said ejection pressure constant. The increased ejection pressure leads in particular to lower bulk densities and to greater homogeneity of product (narrower bead size distribution).

During the depressurization, the blowing agent comprised in the pellets expands, in such a way that expanded foam beads are obtained. After the depressurization, a suspension of expanded foam beads is thus obtained.

During the depressurization step, the suspension can be brought into contact with a suitable liquid coolant (quenching). The coolant is generally added by way of one or more nozzles arranged in the form of a ring after the corresponding depressurization apparatus. This gives foam beads with a thicker skin and thus gives a smoother and glossier bead surface in comparison with a depressurization step without quenching. Products of this type lead to advantages during subsequent processing to give moldings, and in the resultant moldings (smoother, glossier molding surface). A corresponding process is described by way of example for foams made of polypropylene beads in EP 2336225. It is preferable to use water as coolant, the temperature of the water being from 5° C. to 50° C. The quantitative ratio of the coolant to the suspension medium used is at least from 0.3 to 20, and preferably from 0.6 to 10.

The expanded foam beads can be isolated from the suspension in the usual way, for example via filtration, for example using a mesh sieve or static sieve, or by way of a continuously operating centrifuge. Residual adherent suspension medium and/or residual adherent suspension aid can moreover optionally be removed before or after the isolation process. The expanded foam beads can then be washed and dried.

In a further step, at least unfoamed beads are separated out with suitable sieves.

The bulk density of the expanded foam beads obtained after step (iii) is usually from 5 to 300 kg/m$^3$, preferably from 30 to 200 kg/m$^3$, and particularly preferably from 60 to 120 kg/m$^3$.

In another embodiment of the process of the invention, the expanded foam beads (expanded foam beads S) obtained in step (iii) are further foamed in order to obtain expanded foam beads N of lower bulk density. This step is also termed "afterfoaming". This additional step is in particular used in order to utilize the transport and storage advantage of foam beads with high bulk densities. Production of a desired low bulk density can then be delayed until it is required.

Processes for further foaming of the expanded foam beads S obtained in step (iii) of the process of the invention are known to the person skilled in the art and are described by way of example in EP 1 533 335.

The foam beads S can optionally be provided with an anticaking agent prior to afterfoaming. In one preferred embodiment this is achieved via coating. Typical anticaking agents are likewise described in EP 1 533 335. The ratio of bulk density of the expanded foam beads S to the bulk density of the afterfoamed expanded foam beads N is known as the expansion factor, and is particularly preferably from 1.2 to 3.

The expanded foam beads S or N produced in the invention are predominantly closed-celled, the volume proportion of closed cells being determined by a method based on DIN EN ISO 4590 of Aug. 1, 2003, and generally have a cell density (number of cells/area) of from 1 to 750 cells/mm$^2$, preferably from 2 to 500 cells/mm$^2$, in particular from 5 to 200 cells/mm$^2$, and with particular preference from 10 to 100 cells/mm$^2$.

The expanded foam beads S or N are generally at least approximately spherical, and their diameter is usually from 0.1 to 30 mm, preferably from 0.2 to 25 mm, and in particular from 2.5 to 12 mm. In the case of foam beads that are not spherical, being by way of example elongate, cylindrical, or ellipsoidal, diameter means the longest dimension.

The crystalline structure of the expanded foam beads can be characterized by differential scanning calorimetry (DSC) in accordance with ISO 11357-3 (German version of Apr. 1, 2013). For this, from 3 to 5 mg of the foam beads are heated at temperatures from 20° C. to 200° C. at a heating rate of 20° C./min, and the resultant heat flux is determined in the 1$^{st}$ pass.

At least two and up to five, but usually four endothermic peaks can in each case be detected in the 1$^{st}$ DSC pass.

It has now been found that the foam beads have good processability—in particular good fusion properties—when the sum of the endothermic peaks (i.e. in FIG. 1 the sum of the quantities of heat corresponding to the areas A, B, C, D and E) gives a quantity of heat of at least 5 J/g. The improved fusion can give moldings with improved mechanical properties, e.g. in the tensile test.

The present application also provides expanded foam beads obtainable via the process of the invention. These differ from the foam beads known from WO00/068303 in that in DSC in accordance with ISO 11357-3 (German version of Apr. 1, 2013) they exhibit a double or multiple peak structure. The higher crystallinity of the foam beads of the invention is clear from the quantity of endothermic heat measured (greater than or equal to 5 J/g) in DSC in accordance with ISO 11357-3 (German version of Apr. 1, 2013). In contrast to EP1378538, exclusively endothermic heat fluxes occur.

The foam beads S or N can be provided with an antistatic agent. In one preferred embodiment, this is achieved via coating.

The expanded foam beads S or N produced in the invention can be used to produce foamed moldings (foams) by processes known to the person skilled in the art. By way of example, the expanded foam beads S or N can be adhesive-bonded to one another with the aid of an adhesive in a continuous or batch process, for example using polyurethane adhesives known from the literature.

However, it is preferable that the expanded foam beads are fused to one another in a closed mold with exposure to heat. For this, the foam beads are charged to the mold, and once the mold has been closed steam or hot air is introduced, causing further expansion of the foam beads and fusion of these to one another to give the foam, preferably of density in the range from 8 to 300 kg/m$^3$. The foams can be semifinished products, such as sheets, profiles, or webs, or finished moldings of simple or complicated geometry. The nomenclature accordingly includes foam, semifinished foam products, and foam moldings.

The present invention therefore also provides a foam comprising expanded foam beads S or N, which can be produced, preferably which has been produced, via the process of the invention.

The present invention further provides a molding which can be produced, preferably which has been produced, from the expanded foam beads S or N that can be produced in the invention.

The present invention also provides a molding comprising expanded foam beads S or N which can be produced via the process of the invention.

The present invention also provides a process for the production of a molding, comprising at least the following steps:
1. Production of expanded foam beads S or N in accordance with the abovementioned process of the invention, and
2. foaming of the foam beads S or N in an appropriate mold in order to obtain a molding.

In this process, expanded foam beads S or N are first produced according to the steps (i) to (iii) as described above. The expanded foam beads S can optionally be used to produce the foam beads N via afterfoaming.

The step (2.) comprises the foaming of the expanded foam beads S or N in an appropriate mold in order to obtain a molding.

In one preferred embodiment, step (2.) is carried out by fusing expanded foam beads S or N to one another in a closed mold with exposure to heat. For this, the foam beads are preferably charged to the mold and, after the mold has been closed, steam or hot air is introduced, causing further expansion of the foam beads and fusion of these to one another to give the molding, preferably of density in the range from 8 to 350 kg/m'. The ratio of the density of the molding to the bulk density of the expanded foam beads here is generally >1.1.

In one very particularly preferred embodiment, the moldings are obtained by processes known to the person skilled in the art, for example pressure-fill processes or compression processes, the positive mold process or crack process, or after prior pressurization. Corresponding processes are disclosed in DE-A 25 42 453 and EP-A-0 072 499.

The present invention also provides the use of the expanded foam beads which can be produced in the invention for the production of moldings.

Moldings made of foam beads which consist to an extent of 100% of biodegradable polyester based on aliphatic or aliphatic and aromatic dicarboxylic acids and on aliphatic diols (e.g. polyester A) usually exhibit good tensile strength values and good compressive strength values, high rebound, and adequately low compression set, and also acceptable resistance to temperature change.

However, for certain applications in the sports and leisure sector, but in particular in the packaging industry or automobile industry, and also for technical applications, requirements are more focused on increased compressive strength values with reduced rebound, or in other words increased energy absorption. These target values can be achieved in accordance with the particular application profile by varying the concentration of the PLA used.

The following examples illustrate, but do not restrict, the invention:

EXAMPLES

I. Polyester Mixtures used in the Form of Pellets:
The polyester mixtures listed in table 1 were used in the inventive examples.
Materials Used:
Polyester A:

The polyester was produced by mixing 87.3 kg of dimethyl terephthalate, 80.3 kg of adipic acid, 117 kg of 1,4-butanediol, and 0.2 kg of glycerol together with 0.028 kg of tetrabutyl orthotitanate (TBOT), the molar ratio between alcohol component and acid components here being 1.30. The reaction mixture was heated to a temperature of 180° C., and reacted for 6 h at this temperature. The temperature was then increased to 240° C., and the excess dihydroxy compound was removed by distillation in vacuo over a period of 3 h. 0.9 kg of hexamethylene diisocyanate was then slowly metered into the mixture at 240° C. within 1 h.

The melting point in accordance with DSC of the resultant polyester A was 119° C., its molar mass (Mn) was 23 000 g/mol, and its MVR (at 190° C.; 2.16 kg) was 3.3 g/10 min.

This polyester A was pelletized in an extruder with underwater pelletization (UWP) to give pellets of weight 40 mg (A1) and 10 mg (A2).

i-1 Polyester Mixture (Inventive)

88.4 kg of polyester A, 1, 9 kg of Ingeo® 4043D polylactic acid (PLA) from NatureWorks LLC, 2.4 kg of calcium carbonate, 0.1 kg of Joncryl® ADR 4368 from BASF B. V. and 0.1 kg of erucamide were compounded in a Werner & Pfleiderer MC-40 extruder at a melt temperature of about 220-260° C. and pelletized by underwater pelletization (UWP) to give beads of average weight (arithmetic average) 31 mg.

Compi-2 Polyester Mixture (Comparative System)

20 kg of polyester A1 and 80 kg of Ingeo® 4043D polylactic acid (PLA) from NatureWorks LLC, were compounded in a Werner & Pfleiderer MC-40 extruder at melt temperature of about 220-260° C., and pelletized by underwater pelletization (UWP) to give beads of average weight (arithmetic average) 31 mg.

TABLE 1

| Polyester mixture | Pellet type | Average pellet weight (span width) [mg] | Melting point (DSC) [° C.] | MVR ISO 1133 (190° C.; 5 kg) [ml/10 min] |
|---|---|---|---|---|
| i-1 | UWP | 31 (30-33) | 115-125 140-155 | 5.0-11.0 |
| Compi-2 | UWP | 29 (27-31) | 110-120 140-155 | 7.5-11.5 |

II. General Experimental Description of Steps (i) to (iii) of the Process of the Invention:
The experiments were carried out with a tank fill level of 80%.

Examples 1 to 5, and Comp6-Comp9 with Phase Ratio 0.38

100 parts by weight (corresponding to 26.9% by weight, based on the entire suspension without blowing agent) of the pellets comprising the polyester mixture i-1 or compi-2, 265 parts by weight (corresponding to 71.3% by weight, based on the entire suspension without blowing agent) of water, 6.7 parts by weight of calcium carbonate, 0.13 part by weight of a surface-active substance, and the corresponding quantity of blowing agent (based on the quantity of pellets used) were heated to impregnation temperature (IMT), with stirring. Nitrogen was then also applied under pressure to the liquid phase at 50° C., and the internal pressure was adjusted to a previously defined pressure (e.g. 8 bar).

On reaching IMT, and the corresponding IMP after compliance with the retention time, depressurization is then carried out by way of a depressurization device.

Table 2 lists the precise production parameters of the inventive examples 1 to 5, and also of the comparative examples comp6-comp9, and also the properties of the resultant foam beads S.

III. Production of the Moldings:

The moldings were produced in a commercially available EPP molding machine (K68 from Kurtz GmbH). Cuboidal test blocks of various thicknesses were produced with molds of dimensions 315×210×25 mm and 300*200*60 mm. The moldings of thickness 60 mm were produced by the pressure-fill process; the moldings of thickness 25 mm were produced by the crack-fill process.

After production, the moldings were stored at 60° C. for 16 h.

Table 3 lists the results of tests on the moldings.

Test Methods:

Bulk Density

The determination was based on the method of DIN EN ISO: 2000-1. The foam beads here were charged with the aid of a funnel of defined geometry (completely filled with beads) to a measuring cylinder of known volume, the excess beads were removed from the measuring cylinder by passage of a straight-edged rod, and the contents of the measuring cylinder were determined by weighing.

The height of the funnel used was 40 cm, and it had an aperture angle of 35° C., and an outlet of diameter 50 mm. The internal diameter of the measuring cylinder was 188 mm, and its volume was 10 l.

The bulk density BD is calculated from the mass of the beads [kg]/0.01 [m$^3$].

The average value from 3 measurements has been stated as bulk density in kg/m$^3$.

DSC (Differential Scanning Calorimetry)

Method in accordance with ISO 11357-3 (German version of Apr. 1, 2013) using Q100 DSC from TA Instruments.

To determine the melting point of the polyester used in pellet form, from 3 to 5 mg were heated in a 1$^{st}$ pass at temperatures from 20° C. to 200° C. at a heating rate of 20° C./min, and then cooled to 20° C. at 10° C./min, and then a further heating cycle (2$^{nd}$ pass) was carried out with a heating rate of 10° C./min.

The temperature of the peak maximum in the 2$^{nd}$ pass has been stated as melting point.

To characterize the crystalline structure of the expanded foam beads, 3 to 5 mg are heated at temperatures from 20° C. to 200° C. at a heating rate of 20° C./min, and the resulting heat flux is determined.

Impregnation Quality

Impregnation quality was determined in accordance with a scale of grades:
- Unsatisfactory
- o Acceptable
- + Good Impregnation quality was evaluated according to the following three criteria:
homogeneity of a batch (bead size distribution BSD)
bead surface quality
bead cell structure Each criterion was classified in accordance with the above grades. The overall impregnation quality grade was the poorest individual grade.

Batch Homogeneity Criterion:

The batch of foam beads was freed from unfoamed or incompletely foamed material by using a sieve of mesh width M, where M=BD*1.25, where BD is the average bead diameter in the case of underwater pelletization, and in the case of pellets produced by strand pelletization is the longer diameter of the round or near-elliptical sectional surface. In the event of inadequate homogeneity, the sieve waste is above 15%, i.e. the acceptable fraction (yield) is <85%. In the case of acceptable homogeneity, sieve waste is from 5% to 15%, and in the case of good homogeneity sieve waste is <5%, i.e. the yield is above 95%.

Bead Surface Quality Criterion

In the event of inadequate bead surface, the bead had undergone complete collapse. In the event of acceptable bead surface, the bead surface was rough and matt. In the event of good bead surface, the bead was firm, and the surface was smooth and glossy.

Bead Cell Structure Criterion:

When cell structure was inadequate, compact material was present in the center, and also sometimes at the periphery, of the foam bead or, over the entire volume of the foam bead, there were cells (even if only a few) present with cell walls of thickness >500 μm.

Acceptable cell structure meant complete impregnation of the polymer beads (cellular structure over the entire volume of the foam bead without compact core and, respectively, the thickness of the cell walls in the center was from 150 μm to 500 μm). A layer of thickness <500 μm at the external shell of the foam bead was finely cellular to compact.

When cell structure was good, the thickness of the cell walls in the center was smaller than 150 μm. A layer of thickness <500 μm at the external shell of the foam bead was finely cellular to compact.

Closed-Cell Factor

The volume proportion of closed cells was determined by a method based on DIN EN ISO 4590 of Aug. 1, 2003.

Average Cell Density

The foam structure was assessed via optical image analysis using a PORE!SCAN Advanced Plus from Goldlücke Ingenieurleistungen. For this, in each case 10 foam beads were halved, and in each case one cut surface was subjected to measurement. In the case of foam beads that were not spherical, being for example elongate, cylindrical, or ellipsoidal, the division took place in the direction of the longest dimension.

The average cell density is the ratio of the number of cells on the cut surface to the area of the cut surface, and is stated in 1/mm$^2$.

The value is allocated to a classification system:

| Classification | average cell density [1/mm$^2$] |
|---|---|
| F fine-celled structure | >100 |
| N normal cell structure | 10-100 |
| G coarse-celled structure | <10 |

Degree of Compaction DC

The degree of compaction DC is the ratio of molding density (M density) to bulk density (BD). DC=M density [kg/m$^3$]/BD [kg/ms].

Compression Set (CS)

Compression set was determined by a method based on DIN EN ISO 1856, Method C. After removal of the test sample from the test device and recovery of the test sample, 24 h were allowed to elapse before the thickness was measured.

Heat-Aging

The test samples (180×60×40 mm) were placed in the oven preheated to the appropriate aging temperature (100° C.) and are aged at this temperature for 240 h. The surfaces/edges are assessed as follows:

The surface and edge of the test samples was assessed every 24 h during the aging time in accordance with a scale of grades. For this the test samples were briefly removed from the oven.

| Evaluation | Grade |
| --- | --- |
| no change | 1 |
| edge abrasion | 2 |
| edge disintegration | 3 |
| edge disintegration plus 0 | 4 |
| to 5 mm deep surface damage edge disintegration plus 5 | 5 |
| to 10 mm deep surface damage Sample disintegrates under light pressure from the thumb | 6 |

After the heat-aging has ended, the test samples were carefully removed from the oven and stored for 24 h at room temperature under ambient indoor conditions, and dimensional change was then measured with a caliper cage.

The dimensional change (length, width, height) was calculated from the following formula:

$$DIMC=[(Lo-L1)/Lo]\times 100$$

DIMC=dimensional change in %
Lo=original dimension
L1=dimension after heat-aging Heat resistance was good if surfaces and edges exhibit no changes and the average dimensional change over length, width, and height was <10%.

TABLE 2

| Example | Polyester mixture | Blowing agent | Blowing agent concentration [%] | $N_2$ pressure applied at 50° C. to internal pressure [bar] | Retention time (range from IMT −5° C. to IMT +2° C.) [min] | IMT [° C.] | BD [kg/m³] | Impregnation quality [Grade] | Closed-cell factor [%] | Average cell density [Grade] | DSC $\Sigma$ heat flux [J/g] |
| --- | --- | --- | --- | --- | --- | --- | --- | --- | --- | --- | --- |
| 1 | i-1 | Butane | 24 | 8 | 23 | 105 | 110 | + | >95 | F | 6.7 |
| 2 | i-1 | Butane | 24 | 8 | 20 | 106 | 81 | + | >95 | F | 5.6 |
| 3 | i-1 | $CO_2$ | 12 | — | 26 | 106 | 175 | + | >95 | N | 9.57 |
| 4 | i-1 | $CO_2$ | 12 | — | 29 | 107 | 165 | + | >95 | N | 6.98 |
| 5 | i-1 | $CO_2$ | 12 | — | 36 | 108 | 155 | + | >95 | N | 5.29 |
| comp6 | A1 | Butane | 24 | 8 | 23 | 110 | 97 | + | >95 | G | |
| comp7 | compi2 | Butane | 24 | 8 | 25 | 110 | 766 | − | n.a. | n.a. | n.a. |
| comp8 | compi2 | Butane | 24 | 8 | 3 | 125 | 487 | − | n.a. | n.a. | n.a. |
| comp9 | compi2 | Butane | 24 | 8 | 3 | 134 | *) | − | ) | ) | n.a. | n.a. not applicable

*) no expansion of pellet beads, instead only minipellets

**) no expansion of pellet beads, but instead severe caking, leading to blockage of depressurization valve

TABLE 3

| Molding | Foam bead (Table 2) | DC | Density of molding DIN EN ISO 845 (Jan. 10, 2009) [kg/m³] | Tensile strength DIN EN ISO 1798 (Jan. 4, 2008) [kPa] | Tensile strain at break DIN EN ISO 1798 (Jan. 4, 2008) [%] | Compressive strength at 50% compression DIN EN ISO 844 (Jan. 10, 2009) [kPa] | Rebound resilience DIN EN ISO 8307 (Jan. 3, 2008) [%] | Heat-aging (240 h/100° C.) |
| --- | --- | --- | --- | --- | --- | --- | --- | --- |
| M1 | Example 1 | 1.9 | 210 | 700 | 27 | 535 | 49 | good |
| M2 | Example 2 | 2.3 | 185 | 610 | 30 | 436 | 52 | good |
| M3 | Comparative example 6 | 1.9 | 185 | 785 | 100 | 375 | 63 | good |

The invention claimed is:

1. A process for the production of expanded foam beads, the foam beads prepared from pellets comprising a polyester mixture comprising
   a) from 60 to 95% by weight, based on components a and b, of a biodegradable polyester based on aliphatic, or a mixture of aliphatic and aromatic, dicarboxylic acids and on aliphatic diols, and
   b) from 5 to 40% by weight, based on components a and b, of polylactic acid,
   the process comprising the following steps:
   (i) providing a suspension of the polyester pellets in a suspension medium,
   (ii) impregnating the pellets in the suspension of step (i) with at least one physical blowing agent to provide a suspension of blowing-agent-loaded pellets, wherein the impregnating includes heating the suspension of pellets to an impregnation temperature in a range from 100 to 140° C., with stirring, and
   (iii) depressurizing and cooling the suspension obtained in step (ii)-to provide the expanded foam beads, wherein the depressurization and cooling is carried out with a liquid coolant in a ratio of coolant to suspension medium of 0.3 to 20,
   wherein the at least one blowing agent is added in step (i), or in step (ii) during the heating, or after the heating, and
   wherein, following the heating of step (ii) and the addition of the at least one blowing agent, the heated suspension is maintained at a temperature in a range from the impregnation temperature minus 5° C. to the impregnation temperature plus 2° C. for a period of 15 to 40 minutes; wherein the biodegradable polyester comprises:
   A1) from 30 to 100 mol %, based on components A1) and A2), of one or more of an aliphatic dicarboxylic acid selected from the group consisting of succinic acid, adipic acid, sebacic acid and mixtures thereof,
   A2) from 0 to 70 mol %, based on components A1) and A2), of terephthalic acid,
   B) from 98.5 to 100 mol %, based on components A1) and A2), of 1,4-butanediol or 1,3-propanediol; and
   C) from 0.05 to 1.5% by weight, based on components A1), A2) and B), of one or more compounds selected from the group consisting of:
   C1) glycerol,
   C2) hexamethylene diisocyanate, and
   C3) a di- or polyfunctional epoxide.

2. The process according to claim 1, wherein the suspension medium is water.

3. The process according to claim 1, wherein the biodegradable polyester is polybutylene adipate-co-terephthalate, polybutylene sebacate-co-terephthalate, or a mixture thereof.

4. The process according to claim 1, wherein the polyester pellets have an arithmetically averaged pellet weight of at least 5 mg and at most 60 mg.

5. The process according to claim 1, wherein the physical blowing agent n-butane, isobutane, or $CO_2$.

6. The process according to claim 1, wherein the polyester pellet includes from 0.02% to 0.2% by weight, based on the polyester components a) and b), of talc powder as a nucleating agent.

7. The process according to claim 1, wherein step (ii) further comprises, at a temperature below the first melting point of the polyester mixture, as determined with DSC, increasing the pressure above the suspension to 2 to 15 bar.

8. The process according to claim 1, wherein the biodegradable polyester comprises from 40 to 60 mol %, based on components A1 and A2, of component A1, and 40 to 60 mol %, based on components A1 and A2, of component A2.

* * * * *